March 1, 1966 G. D. JONASSEN 3,237,751
SELECTIVELY OPERATED ARTICLE TRANSFER APPARATUS
Filed Sept. 26, 1963 2 Sheets-Sheet 1
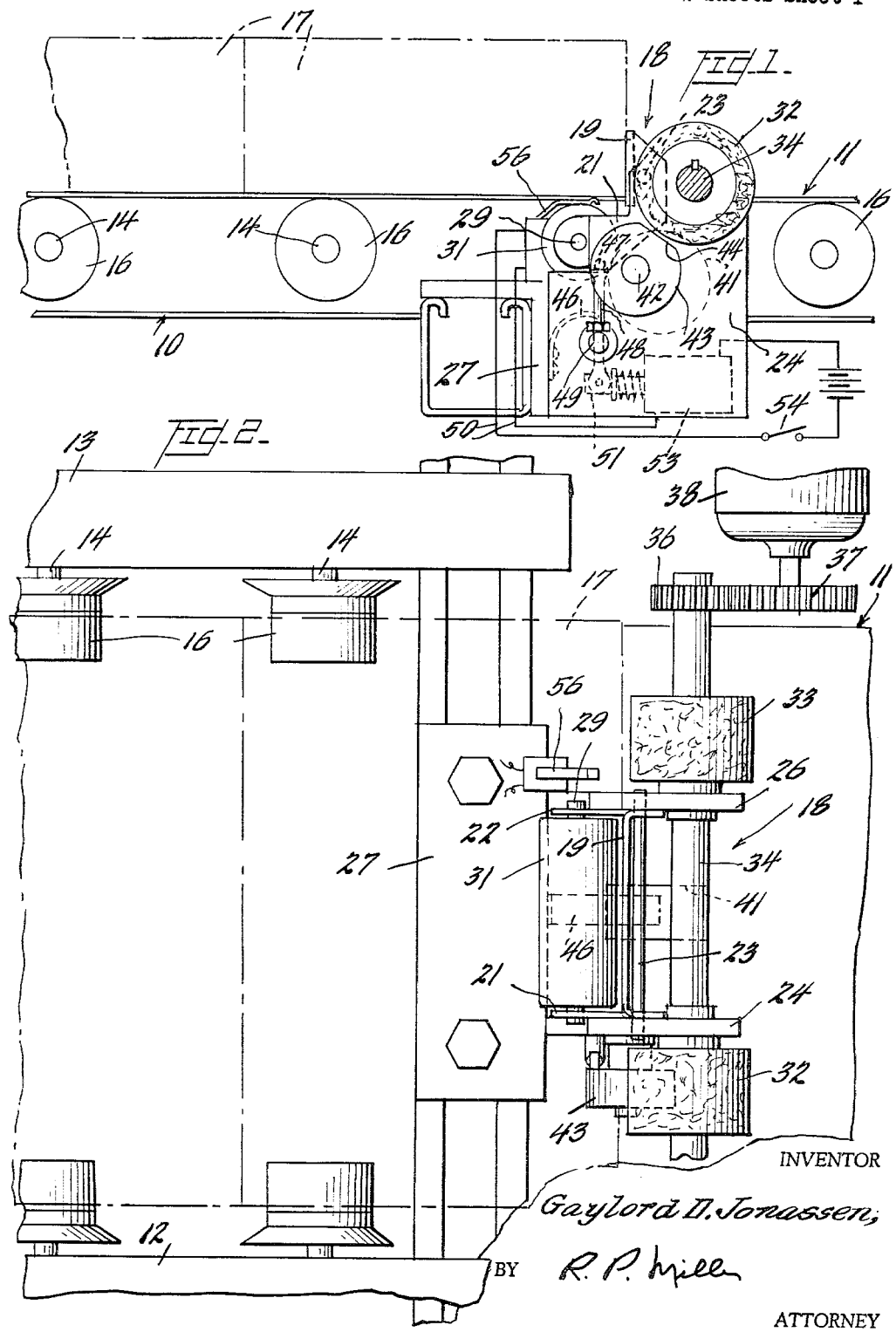
INVENTOR
Gaylord D. Jonassen;
BY R. P. Miller
ATTORNEY

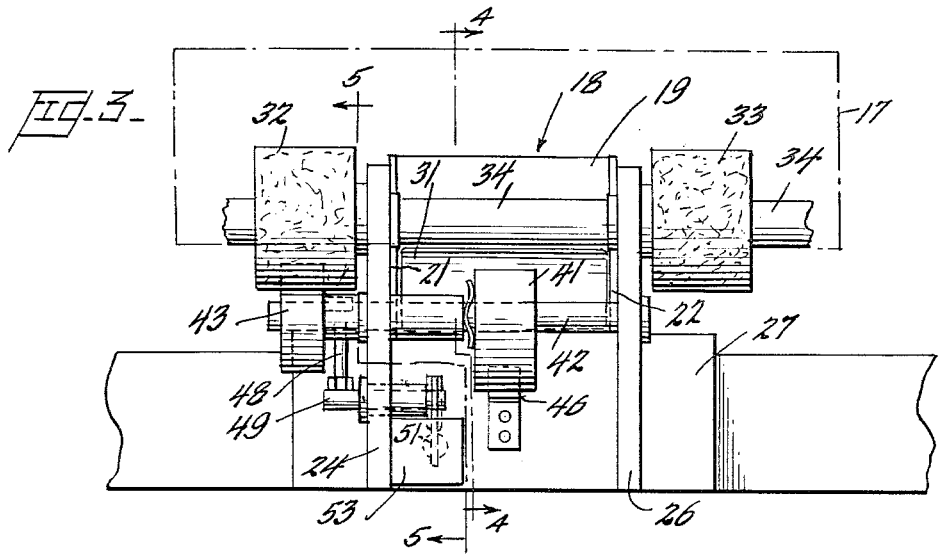
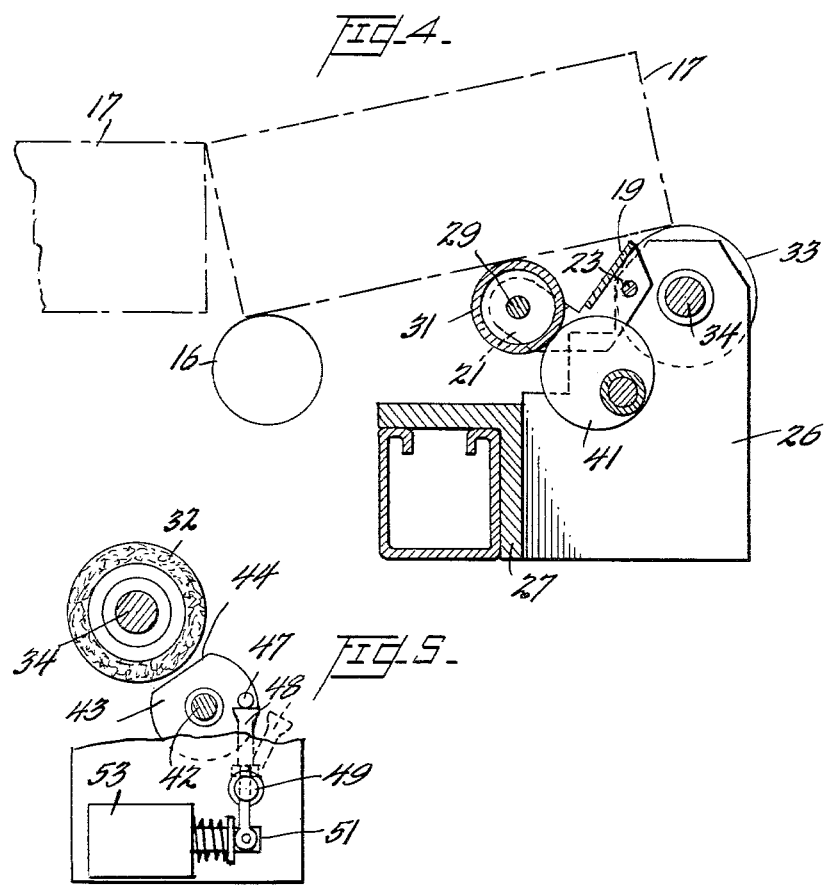
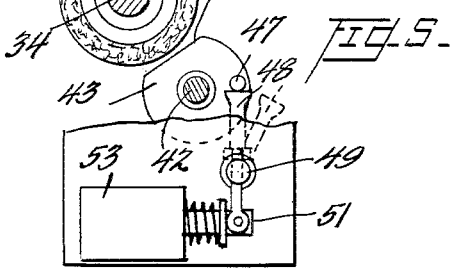

United States Patent Office 3,237,751
Patented Mar. 1, 1966

3,237,751
SELECTIVELY OPERATED ARTICLE TRANSFER APPARATUS
Gaylord D. Jonassen, Smithtown, N.Y., assignor to Western Electric Company, Incorporated, New York, N.Y., a corporation of New York
Filed Sept. 26, 1963, Ser. No. 311,848
10 Claims. (Cl. 198—34)

This invention relates to selectively operated article transfer apparatus and more particularly to an apparatus for lifting an article or package on a first conveyor and then positively advancing the article onto a second conveyor.

Articles or packages loaded in gravity chutes or onto conveyors are often accumulated and then selectively dispensed into a receiving device such as a second chute or conveyor. In the past, such dispensing devices when used with gravity chutes or conveyors required complicated gating devices, steep incline mounting of the chutes and/or elaborate control mechanisms. These dispensing devices have large space requirements and necessitate continuous maintenance.

It is an object of the present invention to provide a new and improved selectively operated article transfer apparatus.

Another object of the invention relates to a positive acting transfer device for the use with gravity chutes or conveyors mounted at small inclines.

A further object of the invention is the provision of a simple transfer device which will lift an article off of a first conveyor and positively transfer the article onto a feed roller which functions to move the article onto a second conveyor.

An additional object of the invention resides in a novel selective drive mechanism including an eccentric for pivoting and rotating a roller to lift an article positioned on one conveyor and simultaneously advance the article onto a constantly rotating transfer roller.

With these and other objects in view, the present invention contemplates a stop and transfer mechanism for selectively controlling the advance of packages along an incline gravity feed conveyor. The mechanism includes a pivotally mounted stop which has one end projecting into the path of movement of the packages along the conveyor and the other end providing a mounting for a transfer roller. When the stop is pivoted from engagement with the leading edge of a package, the transfer roller is pivoted to engage and lift the package. As the transfer roller is pivoted, it is also rotated to advance the package onto a pair of constantly rotating feed rollers which function to further advance the package onto a second conveyor.

Other objects and advantages of the present invention will be apparent from the following detailed description when considered in conjunction with the accompanying drawings, wherein:

FIG. 1 is a side elevational view of an apparatus for selectively transferring packages from one section of a conveyor to a second section embodying the principles of the present invention;

FIG. 2 is a top view of the transferring apparatus shown in FIG. 1 particularly illustrating a pair of constantly rotating feed rollers;

FIG. 3 is a front view of the transferring apparatus shown in FIGS. 1 and 2 showing a mechanism for lifting a package onto the feed rollers;

FIG. 4 is a sectional view taken along line 4—4 of FIG. 3 depicting a package in the process of being lifted from the first conveyor section by a transfer roller onto the feed rollers; and FIG. 5 is a sectional view taken along line 5—5 of FIG. 3 disclosing a selectively operated stop device for controlling the operation of the transferring apparatus.

Referring first to FIGS. 1 and 2, there is shown a pair of conventional gravity feed type conveyor assemblies or sections 10 and 11. Each of these assemblies includes a pair of side frames 12 and 13 providing mountings for stud shafts 14 onto which is rotatably mounted individual guide rollers 16. Packages 17 may be placed on the conveyor assembly 10 and advanced by gravity or pushed towards the conveyor section 11. Interposed between the conveyor sections 10 and 11 is a package or article transfer device 18 for selectively controlling the advance of the packages 17 from one conveyor section 10 onto the other conveyor section 11.

This transfer device 18 includes a stop bracket 19 having downwardly projecting side arms or levers 21 and 22 (see also FIG. 3) pivotally mounted on a rod 23 extending between support plates 24 and 26 which are secured to a fixed channel housing 27. The upper portion of the stop bracket 19 engages the front face of a leading package 17 and thus precludes advance of the package onto the conveyor section 11. Extending between the lower sections of the side arms 21 and 22 is a shaft 29 which provides a rotatable support for a transfer roller 31. This transfer roller may be pivoted and rotated to lift and advance a leading package 17 onto a pair of constantly rotating feed rollers 32 and 33.

The feed rollers 32 and 33 are keyed to a shaft 34 which extends through the plates 24 and 26. One end of the shaft 34 has a pinion 36 mounted thereon to engage a drive gear 37 that is continuously rotated by a motor 38. The feed roller 32 may consist of a metallic hub with a rim constructed of rubber or other friction material.

Considering now the mechanism for rotating the stop 19 out of the path of the package 17 and moving the transfer roller 31 to advance the package 17 onto the rollers 32 and 33, there is provided an eccentric 41 fixed to a shaft 42 rotatably mounted within the side plates 24 and 26. The shaft 42 extends through the plate 24 to provide a mounting for a drive roller 43. The drive roller 43 is fixed to the shaft 42 and is provided with a flat or otherwise suitably shaped portion 44 in registry with but spaced from the constantly rotating feed roller 32. Mounted on the channels housing 27 is a leaf spring 46 which engages the periphery of the eccentric 41 to urge it to move in a counterclockwise direction. The tendency for counterclockwise rotation of the eccentric 41 is transmitted through the shaft 42 to the drive roller 43. Drive roller 43 is precluded from rotation by a laterally extending lug 47 (see also FIG. 5) engaging a stop arm 48 pivotally mounted on a stud shaft 49. The lower extremity of the stop arm 48 is attached to an armature 51 of a solenoid 53. A simple energizing circuit 50, including a push button 54, is connected to selectively operate the solenoid 53. This circuit also includes a sensing switch 56 which will ascertain the presence of a package abutting the stop bracket 19.

In order to effectuate a transfer of a package 17 from the conveyor section 10 onto the conveyor section 11 when the switch 56 is closed, the push button 54 is depressed to energize the solenoid 53. The solenoid draws in the armature 51 to pivot the stop arm from engagement with the stop lug 47. The leaf spring 46 is now effective to impart a slight rotation of the eccentric 41 thereby rotating the shaft 42 and the drive roller 43. The flat 44 on the drive roller moves away from the constantly rotating feed roller to permit the feed roller to engage the periphery of the drive roller 43. Now, rotation of the drive roller 43 is imparted to the shaft 42 to positively drive the eccentric 41. As the eccentric 41 rotates (see FIG. 4), the periphery will engage and pivot the transfer roller 31 into engagement with the package 17. Pivotal movement of the transfer roller 31 effectuates a withdrawal of the stop bracket 19 from the leading face of the package 17. This leading edge of the stop bracket 19 is withdrawn within the peripheries of the feed rollers 32 as best illustrated in FIG. 4. The rotation of the eccentric 41 in a counterclockwise direction effectuates a clockwise rotation of the engaged transfer roller 31. This rotation of the transfer roller 31 acts against the underside of the package 17 to thrust the forward end of the package onto the feed rollers 32, lifting the package off of switch 56, and deenergizing solenoid 53. The package, now engaged by feed rollers 32 and 33, is quickly moved onto the conveyor assembly 11. As soon as the drive roller 43 completes one revolution, the flat 44 is presented to the feed roller 32 to preclude further operation of the transfer mechanism 18. At this time, the solenoid 53 is deenergized to reposition the stop arm 48 to engage the stop lug 47 thus conditioning the mechanism 18 for another cycle of operation.

The transfer device 18 can also be used to continuously control the spacing of individual packages in a group of packages being advanced from conveyor section 10 to conveyor section 11. In this instance the push button 54 will be held closed to permit the solenoid 53 and, hence, the transfer device 18, to cyclically operate. It will be noted that the shaft 29 lies in a horizontal plane which is below the horizontal plane in which the rod 23 lies. This arrangement insures that each succeeding package initially abuts the transfer roller 31 to apply a force which tends to rotate the roller 31 in a counterclockwise direction and thus back to the initial position shown in FIG. 1.

It is to be understood that the above-described arrangement of apparatus and construction of elemental parts are simply illustrative of an application of the principles of the invention, and many other modifications may be made without departing from the invention.

What is claimed is:

1. In an apparatus for transferring an article along a conveyor,
    movably mounted means for holding an article from advance along said conveyor,
    a transfer roller rotatably mounted on said holding means,
    a constantly rotating feed roller means mounted beyond the holding means in the direction of movement of the article along the conveyor, and
    means for moving the holding means to release the article and position the transfer roller to lift the article while rotating the transfer roller to advance the article onto the feed roller means.

2. In an apparatus for transferring an article along a conveyor,
    a constantly rotating feed roller means positioned in the path of movement of the article along the conveyor,
    a movably mounted stop for holding the article from movement onto the feed roller means,
    a transfer roller mounted for movement to lift and advance the article onto the feed roller means, and
    selectively operated means for applying the rotation of the feed roller means to move the stop from the article while moving the transfer roller to lift and advance the article onto the feed rollers.

3. In a conveyor apparatus for selectively feeding cartons,
    a conveyor track for advancing cartons,
    a stop means pivotally mounted and positioned to engage a carton moving in a predetermined direction along said conveyor track,
    a roller rotatably mounted on said stop means and positioned to engage the underside of a carton, and
    means for engaging and rotating said roller to pivot said stop means out of the path of the carton whereupon said rotating roller advances the carton past the pivoted stop and along the track.

4. In a stop mechanism for controlling the advance of an article moving along a conveyor,
    a stop means movably mounted in the path of the article moving along the conveyor,
    a constantly rotating roller means positioned along the conveyor and beyond the stop means in the direction of movement of the article,
    a transfer roller mounted on said stop means and juxtaposed to the underside of an article engaging said stop means, and
    means for moving the stop means out of the path of the article and moving the transfer roller into engagement with the article while simultaneously rotating the transfer roller to drive the article onto the constantly rotating roller.

5. In a mechanism for selectively controlling the advance of an article along a conveyor,
    a pair of constantly rotating feed rollers having peripheries extending above the plane of the conveyor,
    a stop means movably mounted and interposed between said feed rollers and projecting beyond the peripheries of said feed rollers for holding articles from advancing into engagement with said feed rollers,
    a transfer roller mounted on said stop means in juxtaposition to the underside of an article engaging said stop, and
    means for moving said transfer roller to withdraw said stop means within the peripheries of said driving rollers while rotating said transfer roller and moving said transfer roller into engagement with the underside of said article whereupon said article is advanced onto said feed rollers.

6. In an article transfer device for moving a package from a first section of a conveyor onto a second section,
    a pivotally mounted stop member having one end projecting into the path of movement of a package on said first conveyor section,
    a transfer roller mounted on the opposite end of said stop member and positioned to engage the underside of a package engaging said stop member,
    a constantly rotating feed roller means for receiving a package moving past said stop member,
    an eccentric engaging said transfer roller, and means for rotating the eccentric to pivot and rotate said transfer roller to withdraw the stop member from the path of movement of the package and move the transfer roller into engagement with the underside of the package whereupon the package is advanced onto the feed roller means.

7. In a mechanism for transferring an article onto a constantly rotating feed roller,
    a drive roller having a flat spaced from said rotating feed roller,
    means for urging the drive roller to rotate and move the non-flat periphery thereof into engagement with the rotating roller,
    means for holding the drive roller from movement by said urging means,
    a transfer roller positioned beneath an article to be transferred onto the rotating feed roller,
    means for releasing said holding means to render said urging means effective to move the non-flat periphery of said drive roller into engagement with said rotating feed roller whereupon rotation is imparted to said drive roller, and
    means operated by said drive roller for moving said transfer roller into engagement with said article and for rotating said transfer roller to advance said article onto the rotating feed roller.

8. In a mechanism for advancing a package from a first conveyor section onto a second conveyor section, a pair of axially spaced constantly rotating feed roller means interposed between said conveyor sections, a pivotally mounted stop interposed between said pair of rotating feed roller means and between said feed roller means and said first conveyor section for engaging and holding a package from movement onto said feed roller means, a drive roller having a flat formed thereon in register with and spaced from one of said rotating feed roller means, a rotatably mounted eccentric connected to said drive roller, means for urging said eccentric to rotate said drive roller to move the non-flat periphery into driving engagement with said registered rotating feed roller means, means for holding said eccentric from rotating said drive roller, a transfer roller mounted on said stop for engaging the periphery of said eccentric and for engaging the underside of a package held by said stop, and means for releasing the holding means to render said urging means effective to rotate said drive roller to move the non-flat periphery thereof into engagement with said rotating feed roller means whereupon the drive roller is rotated to rotate the eccentric and thus pivot the stop from engagement with the package and pivot and rotate the transfer roller to lift and advance the package onto the feed roller means.

9. In a conveyor apparatus for selectively transferring cartons, a drive shaft, an eccentric fixed to the drive shaft, a pivotally mounted stop bracket having a first end projecting into the path of movement of the carton along the conveyor to engagingly stop the advancement of a carton, a transfer roller rotatably mounted on a second end of the stop bracket and having its periphery engaging the eccentric, means for selectively actuating the drive shaft to rotate the eccentric to pivot the stop bracket from engagement with the carton and to pivot and rotate the transfer roller to lift and advance the carton.

10. In an apparatus for selectively transferring articles along a conveyor, a pivotally mounted stop bracket having one end projecting into the path of movement of an article along the conveyor to engagingly stop the advancement of the article, a transfer roller rotatably mounted on the second end of the stop bracket, a constantly rotating feed roller positoned transversely to the path of movement of an article along the conveyor and having its periphery extending above the plane of the conveyor, a drive roller positioned to selectively engage the constantly rotating feed roller, an eccentric connected to the drive roller and in engagement with the transfer roller, and means for selectively engaging the drive roller with the constantly rotating feed roller to rotate the drive roller and the eccentric to pivot the stop bracket from the path of the article and to pivot and rotate the transfer roller to lift and advance the article onto the constantly rotating feed roller.

References Cited by the Examiner

UNITED STATES PATENTS

| | | |
|---|---|---|
| 2,046,549 | 7/1936 | Crowell. |
| 2,638,203 | 5/1953 | Mayer _____ 198—34 |
| 2,738,103 | 3/1956 | Bisese. |
| 2,794,534 | 6/1957 | Forrester _____ 198—34 |
| 2,980,222 | 4/1961 | Crosby. |
| 2,980,234 | 4/1661 | De Koning _____ 198—34 |
| 3,080,042 | 3/1963 | Sherman _____ 193—34 |

GERALD M. FORLENZA, *Primary Examiner.*

MARVIN A. CHAMPION, *Examiner.*